United States Patent
Wu et al.

(10) Patent No.: US 11,458,677 B2
(45) Date of Patent: Oct. 4, 2022

(54) SELECTIVE LASER SINTERING COMPOSITION AND SELECTIVE LASER SINTERING 3D PRINTING METHOD EMPLOYING THE SAME

(71) Applicant: INDUSTRIAL TECHNOLOGY RESEARCH INSTITUTE, Hsinchu (TW)

(72) Inventors: Jin-An Wu, Huwei Township (TW); Chih-Hung Lee, Taipei (TW); Fan-Jie Lin, New Taipei (TW); Fu-Ming Chien, Hsinchu (TW); Chien-Ming Chen, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 389 days.

(21) Appl. No.: 16/727,259

(22) Filed: Dec. 26, 2019

(65) Prior Publication Data

US 2021/0197450 A1 Jul. 1, 2021

(51) Int. Cl.
*B29C 64/153* (2017.01)
*C08L 23/16* (2006.01)
(Continued)

(52) U.S. Cl.
CPC .......... *B29C 64/153* (2017.08); *B29C 64/268* (2017.08); *C08K 3/22* (2013.01);
(Continued)

(58) Field of Classification Search
CPC ........ B29C 64/153; C08L 23/16; C08L 23/12; C08L 9/06; C08K 3/36; C08K 3/22
See application file for complete search history.

(56) References Cited

U.S. PATENT DOCUMENTS 5,648,450 A * 7/1997 Dickens, Jr. .......... B29C 64/153
428/317.9
6,066,697 A * 5/2000 Coran .................... C08L 15/005
525/193

(Continued)

FOREIGN PATENT DOCUMENTS

CN 103497414 A * 1/2014 .............. C08L 23/12
CN 103756236 A * 4/2014 .............. C08L 23/00
(Continued)

OTHER PUBLICATIONS

CN 109203480 A (Jan. 15, 2019) Zhang, Liqun et al.; machine translation. (Year: 2019).*

(Continued)

*Primary Examiner* — Rip A Lee
(74) *Attorney, Agent, or Firm* — Birch, Stewart, Kolasch & Birch, LLP

(57) ABSTRACT

A selective laser sintering composition and a selective laser sintering 3D printing method employing the same are provided. The selective laser sintering composition includes a nanoscale inorganic powder and a thermoplastic vulcanizate powder. The temperature difference ($\Delta T$) between the onset temperature for melting the thermoplastic vulcanizate powder and the onset temperature at which the thermoplastic crystallizes vulcanizate powder is greater than or equal to 10° C. The thermoplastic vulcanizate powder includes a thermoplastic and a crosslinked polymer. The temperature difference ($\Delta T$) between the onset temperature for melting the thermoplastic and the onset temperature at which the thermoplastic crystallizes is greater than or equal to 10° C. , and the weight ratio of the thermoplastic to the crosslinked polymer is from 1:1 to 1:4.

12 Claims, 1 Drawing Sheet

(51) Int. Cl.
    *C08L 23/12*    (2006.01)
    *C08L 9/06*     (2006.01)
    *C08K 3/22*     (2006.01)
    *C08K 3/36*     (2006.01)
    *C08K 3/26*     (2006.01)
    *B29C 64/268*   (2017.01)
    *B33Y 50/00*    (2015.01)
    *B29K 23/00*    (2006.01)
    *B33Y 10/00*    (2015.01)
    *B33Y 70/10*    (2020.01)

(52) U.S. Cl.
    CPC ............... *C08K 3/26* (2013.01); *C08K 3/36* (2013.01); *C08L 23/12* (2013.01); *C08L 23/16* (2013.01); *B29K 2023/12* (2013.01); *B29K 2023/16* (2013.01); *B33Y 10/00* (2014.12); *B33Y 50/00* (2014.12); *B33Y 70/10* (2020.01); *C08K 2003/222* (2013.01); *C08K 2003/2227* (2013.01); *C08K 2003/2241* (2013.01); *C08K 2003/2296* (2013.01); *C08K 2003/265* (2013.01); *C08K 2201/011* (2013.01); *C08L 9/06* (2013.01); *C08L 2312/06* (2013.01)

(56) References Cited

U.S. PATENT DOCUMENTS

| | | | | |
|---|---|---|---|---|
| 6,136,948 | A * | 10/2000 | Dickens, Jr. | B33Y 70/00 428/317.9 |
| 7,915,345 | B2 * | 3/2011 | Weng | C08L 23/10 525/240 |
| 8,178,625 | B2 * | 5/2012 | Ellul | C08L 47/00 525/332.8 |
| 8,481,646 | B2 * | 7/2013 | Weng | C08L 101/00 525/240 |
| 8,653,197 | B2 * | 2/2014 | Ellul | C08F 210/18 525/332.8 |
| 9,234,093 | B2 * | 1/2016 | Ellul | C08L 23/16 |
| 9,309,396 | B2 * | 4/2016 | Sun | C08L 23/16 |
| 9,757,901 | B2 * | 9/2017 | Greger | C08L 23/20 |
| 10,240,008 | B2 | 3/2019 | Chung et al. | |
| 11,104,819 | B2 * | 8/2021 | Querol Esparch | C08K 3/36 |
| 11,174,332 | B2 * | 11/2021 | Datta | C08F 236/045 |
| 11,193,019 | B2 * | 12/2021 | Wilhelmus | C08L 67/04 |
| 11,236,242 | B2 * | 2/2022 | Gimenez | B33Y 70/00 |
| 2005/0207931 | A1 * | 9/2005 | Hesse | B22F 9/026 419/10 |
| 2008/0122141 | A1 * | 5/2008 | Bedal | C08J 5/00 428/32.72 |
| 2008/0194734 | A1 * | 8/2008 | Lehmann | C08L 23/10 523/351 |
| 2011/0129682 | A1 * | 6/2011 | Kurata | C08L 23/0815 525/240 |
| 2018/0104922 | A1 | 4/2018 | Büsgen et al. | |
| 2019/0276593 | A1 * | 9/2019 | Farrugia | C08K 3/36 |
| 2020/0023577 | A1 * | 1/2020 | Ostermann | C08K 5/357 |
| 2021/0009768 | A1 * | 1/2021 | Rerat | C10M 169/041 |
| 2021/0053276 | A1 * | 2/2021 | Bernardi | B29C 64/118 |
| 2021/0070953 | A1 * | 3/2021 | Resetco | C08J 3/212 |
| 2021/0070993 | A1 * | 3/2021 | Farrugia | B33Y 70/00 |
| 2021/0332232 | A1 * | 10/2021 | Gabriel | B33Y 40/10 |
| 2022/0041889 | A1 * | 2/2022 | Verbeke | B29C 64/153 |

FOREIGN PATENT DOCUMENTS

| | | | | |
|---|---|---|---|---|
| CN | 103756236 | A | | 4/2014 |
| CN | 104761761 | A * | 7/2015 | ............ C08L 7/00 |
| CN | 108137925 | A | | 6/2018 |
| CN | 108139665 | A | | 6/2018 |
| CN | 109203480 | A | | 1/2019 |
| CN | 109203480 | A * | 1/2019 | ......... B29C 64/393 |
| CN | 109423054 | A | | 3/2019 |
| CN | 109790356 | A | | 5/2019 |
| CN | 109790356 | A * | 5/2019 | ......... B29C 64/153 |
| CN | 109796689 | A * | 5/2019 | ............ C08L 23/28 |
| CN | 110225814 | A | | 9/2019 |
| DE | 10 2017 217 339 | A1 * | 4/2019 | ......... C08L 101/00 |
| TW | 201529287 | A | | 8/2015 |
| TW | 201529287 | A * | 8/2015 | ........... B29C 67/04 |
| TW | 201728733 | A | | 8/2017 |

OTHER PUBLICATIONS

CN 109796689 A (May 24, 2019) Duan, Yongxin et al.; machine translation. (Year: 2019).*
DE 102017217339 A1 (Apr. 4, 2019) Winkler, Jens et al.; machine translation. (Year: 2019).*
CN 103756236 A (Apr. 30, 2014) Zhu, Yezhou; machine translation. (Year: 2014).*
CN 103497414 A (Jan. 8, 2014) Jiang, Wen; machine translation. (Year: 2014).*
CN 104761761 A (Jul. 8, 2015) Wang, Dong et al.; machine translation. (Year: 2015).*
Taiwanese Office Action and Search Report for Taiwanese Application No. 10814794, dated Feb. 18, 2021.
Hu et al., "Preparation, morphology and superior performances of biobased thermoplastic elastomer by in situ dynamical vulcanization for 3D-printed materials", Polymer, vol. 108, 2017 (available online Nov. 21, 2016), pp. 11-20 (10 pages).

* cited by examiner

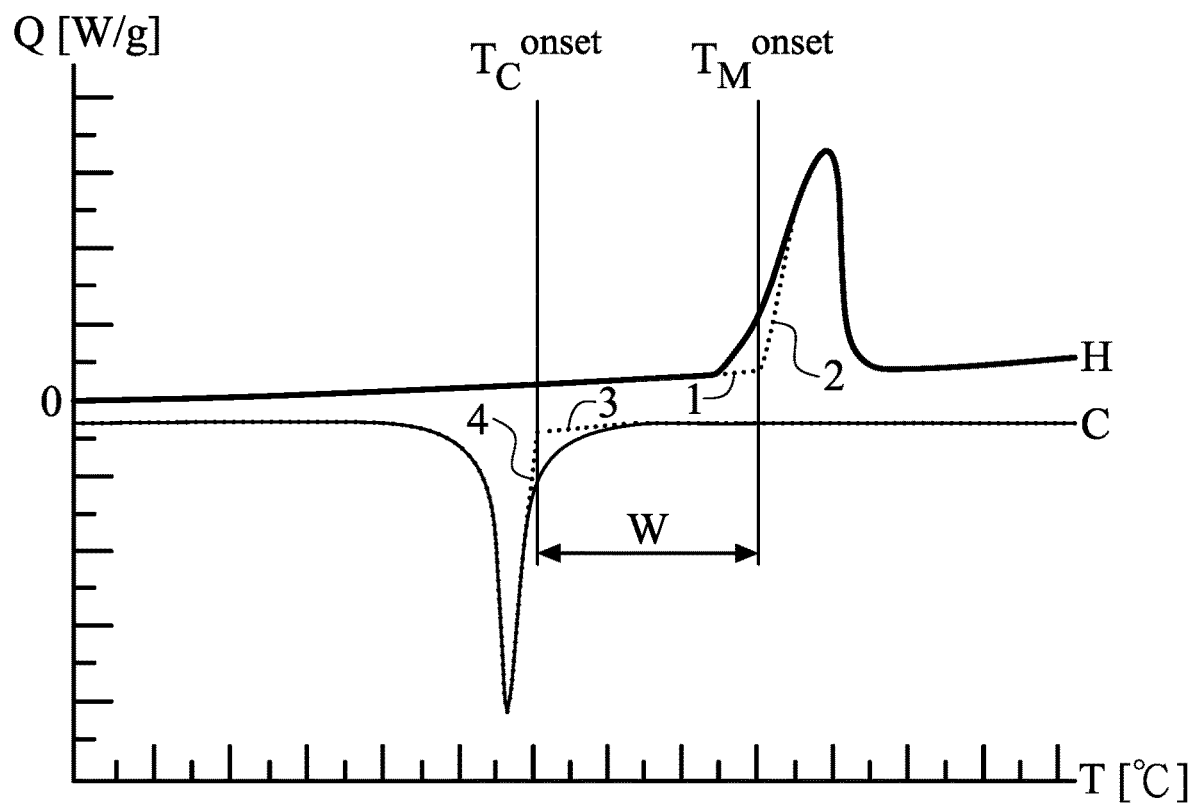

SELECTIVE LASER SINTERING COMPOSITION AND SELECTIVE LASER SINTERING 3D PRINTING METHOD EMPLOYING THE SAME

TECHNICAL FIELD

The disclosure relates to a selective laser sintering composition and a selective laser sintering 3D printing method employing the same.

BACKGROUND

Additive manufacturing (AM) processes (3D printing technology) do not need a mold for the production of components. Additive manufacturing processes currently include fused deposition modeling (FDM), stereolithography (SLA), and selective laser sintering (SLS).

Fused deposition modeling (FDM) has advantages: it does not cost much, and it is a simple process of manufacturing. It also has shortcomings, however, including a slow throughput rate, it can only produce articles of a limited size, and it is not very precise, due to the limitations of the technology itself. The stereolithography (SLA) process requires a liquid plastic resin and a photosensitive polymer, which is then cured by an ultraviolet (UV) laser. SLA is considered one of the slower additive fabrication methods, because small parts may take hours or even days to complete.

The selective laser sintering (SLS) process is performed to form parts layer-by-layer using a high-energy pulse laser. First, a thin layer of material powder is provided in a chamber and then locally melted by a laser beam. After melting and then solidifying the material powder, the level of the chamber is lowered and a new layer of the material powder is applied. The above processes can be repeated. As such, applying the new layer and selective melting the layer are repeated to manufacture the desired components.

The particularly critical factor in selective laser sintering is the sintering window of the material powder for sintering. The sintering widow of the material powder for sintering should be as large as possible to reduce the warping of the compartments during the laser sintering operation. The hard polyamide (e.g. nylon) and poly(ether ether ketone) are general materials used in SLS technology. General soft materials include thermoplastic polyester elastomer, (TPEE), thermoplastic polyurethane (TPU), thermoplastic polyamide elastomer (TPAE), and the like. However, the conventional elastomers often have wider melting temperature rages during a melting process, and an overly fast crystallization speed during cooling. As such, when the conventional elastomers are cooled to crystallize, which are still partially melted. This phenomenon will narrow the process window of the SLS process to negatively influence the sinterability and printing quality of the material.

Accordingly, a novel material powder for laser sintering is called for to improve the sinterability and printing quality in the industry.

SUMMARY

According to embodiments of the disclosure, the disclosure provides a selective laser sintering composition. The selective laser sintering composition includes a nanoscale inorganic powder and a thermoplastic vulcanizate (TPV) powder. The nanoscale inorganic powder has a particle size distribution D90 of 1 nm to 950 nm and the thermoplastic vulcanizate powder has a particle size distribution D90 of 40 µm to 100 µm. The temperature difference ($\Delta T$) between the onset temperature for melting the thermoplastic vulcanizate powder and the onset temperature at which the thermoplastic crystallizes vulcanizate powder is greater than or equal to 10° C. The thermoplastic vulcanizate powder includes a thermoplastic and a crosslinked polymer. The difference ($\Delta T$) between the onset temperature for melting the thermoplastic and the onset temperature at which the thermoplastic crystallizes is greater than or equal to 10° C., and the thermoplastic and the crosslinked polymer have a weight ratio of 1:1 to 1:4. The crosslinked polymer is a crosslinked rubber, a crosslinked thermoplastic elastomer, or a combination thereof.

According to embodiments of the disclosure, the disclosure provides a selective laser sintering 3D printing method. The method includes the flowing steps: (A) forming a film including the described selective laser sintering composition; (B) selectively irradiating the film via laser beam scanning to cure the selective laser sintering composition for forming a part of an object; and (C) repeating step (A) and step (B) until the object is complete.

A detailed description is given in the following embodiments with reference to the accompanying drawings.

BRIEF DESCRIPTION OF THE DRAWINGS

FIG. 1 shows a selective laser sintering composition in one embodiment of the disclosure.

DETAILED DESCRIPTION

The selective laser sintering composition and the selective laser sintering 3D printing method employing the same of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments.

According to embodiments of the disclosure, the disclosure provides a selective laser sintering composition. The selective laser sintering composition includes a nanoscale inorganic powder and a thermoplastic vulcanizate powder. The thermoplastic vulcanizate powder has a particle size distribution D90 of 40 µm to 100 µm, wherein the temperature difference ($\Delta T$) between the onset temperature for melting the thermoplastic vulcanizate powder and the onset temperature at which the thermoplastic crystallizes vulcanizate powder is greater than or equal to 10° C. By adding the specific thermoplastic vulcanizate powder, the selective laser sintering composition of the disclosure can be selectively laser sintered to obtain an elastic object having the same thermal properties as the hard plastic. Therefore, the disclosure provides the elastic material for laser sintering to solve the problem of conventional elastic materials (e.g. difficult to laser sintered due to narrow sintering window).

In addition, the thermoplastic vulcanizate powder of the disclosure includes the thermoplastic serving as continuous phase, and the crosslinked polymer (such as a crosslinked rubber, a crosslinked thermoplastic elastomer, or a combination thereof) serving as disperse phase. As such, the melting behavior of the selective laser sintering composition during the laser sintering process is demonstrated by the thermoplastic, and the selective laser sintering composition has a more obvious and wide sintering window. When the melted composition is cooled, the sintered product has flexibility and elastic recovery deformation property due to the disperse phase of the rubber.

According to embodiments of the disclosure, the disclosure provides a selective laser sintering composition. According to embodiments of the disclosure, the selective laser sintering composition includes a nanoscale inorganic powder and a thermoplastic vulcanizate (TPV) powder. According to embodiments of the disclosure, the nanoscale inorganic powder has a particle size distribution D90 of 1 nm to 950 nm, such as about 1 nm, 5 nm, 10 nm, 20 nm, 50 nm, 100 nm, 150 nm, 200 nm, 300 nm, 400 nm, 500 nm, 600 nm, 700 nm, 800 nm, 900 nm, or 950 nm. If the particle size distribution D90 of the nanoscale inorganic powder is too large, the obtained selective laser sintering composition will have a poor flowability, and the film with a more even thickness cannot be obtained during the powder bed being spread by automatic powder spreading equipment. According to embodiments, the thermoplastic vulcanizate powder may have a particle size distribution D90 of about 40 μm to 100 μm, such as about 40 μm, 50 μm, 60 μm, 70 μm, 80 μm, 90 μm, or 100 μm. If the particle size distribution D90 of the thermoplastic vulcanizate powder is too small, the thermoplastic vulcanizate powder will be easily aggregated due to static electricity, and the thermoplastic vulcanizate powder will be therefore difficult to be evenly dispersed in the film. If the particle size distribution D90 of the thermoplastic vulcanizate powder is too large, the precision of the object formed by selective laser sintering 3D printing the selective laser sintering composition of the disclosure will be lowered. Here, the particle size distribution D90 means that 90 vol % of the powder has a diameter less than the value defined by D90. According to embodiments of the disclosure, the particle size distribution D90 is measured according to the standard ISO 13322-1:2004.

According to embodiments of the disclosure, the nanoscale inorganic powder and the thermoplastic vulcanizate powder have a weight ratio of 0.2:99.8 to 0.8 to 99.2, such as about 0.2:99.8, 0.3:99.7, 0.4:99.6, 05:99.5, 0.6:99.4, 07:99.3, or 0.8:99.2. If the weight ratio of the nanoscale inorganic powder and the thermoplastic vulcanizate powder is too high, the physical properties of the final printed product will be lowered and the material cost will be increased due to the too much organic additives. If the weight ratio of the nanoscale inorganic powder and the thermoplastic vulcanizate powder is too low, the flowability of the obtained selective laser sintering composition will be poor. As such, the film with a more even thickness cannot be obtained during the powder bed being spread by automatic powder spreading equipment.

According to embodiments of the disclosure, the nanoscale inorganic powder can be silicon oxide, aluminum oxide, titanium oxide, calcium carbonate, magnesium silicate, zinc oxide, magnesium oxide, or a combination thereof.

According to embodiments of the disclosure, the selective laser sintering composition further includes an additive, the addition amount of the additive can be 0.1 parts by weight to 30 parts by weight, and the total weight of the nanoscale inorganic powder and the thermoplastic vulcanizate (TPV) powder is 100 parts by weight. According to embodiments, the additive can be dye, pigment, anti-oxidant, stabilizer (e.g. thermal stabilizer, photo stabilizer, or hydrolysis stabilizer), fixative, or a combination thereof.

According the embodiments of the disclosure, the selective laser sintering composition can be composed of the nanoscale inorganic powder and the thermoplastic vulcanizate (TPV) powder.

According to embodiments of the disclosure, the thermoplastic vulcanizate may include a thermoplastic and a crosslinked polymer. Note that in the thermoplastic vulcanizate powder, the crosslinked polymer (rubber phase) may form uniform microscale particle to disperse in the thermoplastic (plastic phase).

Essential to the selective laser sintering process is the melting range of the selective laser sintering composition, which is referred as the "sintering window (W)". The thermoplastic of the disclosure has a sintering window WP, and the thermoplastic vulcanizate powder has a sintering window WT. The sintering window can be measured by differential scanning calorimetry (DSC) according to the standard ASTM D3418.

In the differential scanning calorimetry measurement, the measurement provides a DSC map in which the amount of heat supplied to the sample/the amount of heat removed from the sample Q is plotted as a function of temperature T. A DSC diagram comprising a heating run (H) and a cooling run (C) is depicted by way of example in FIG. 1. The measurement generally involves first performing a heating operation (H), that is, heating the sample and the reference in a linear manner. During sample melting (solid phase change/liquid phase change), an additional amount of heat Q must be supplied to maintain the sample at the same temperature as the reference. A peak is then observed in the DSC plot, called the melting peak. After the heating operation (H), the cooling operation (C) is usually measured. This involves cooling the sample and the reference in a linear manner, i.e. removing heat from the sample and reference. During sample crystallization/solidification (liquid phase change/solid phase change), a higher amount of heat Q must be removed to maintain the sample at the same temperature as the reference due to heat release during crystallization/solidification. In the DSC chart of the cooling operation (C), a peak in the opposite direction to the melting peak is observed, which is called a crystallization peak. The DSC diagram can be used to determine the onset temperature for melting ($T_M$ onset) and the onset temperature for crystallization ($T_C$ onset).

To determine the onset temperature for melting ($T_M$ onset), a first tangent 1 is drawn relative to the baseline of the heating operation (H) at a temperature below the melting peak. A second tangent 2 is drawn relative to the first inflection point of the melting peak at a temperature below the temperature at which the melting peak is at a maximum. Extrapolate the two tangent lines until they intersect. The vertical extrapolation that intersects the temperature axis represents the onset melting temperature ($T_M$ onset). To determine the onset temperature for crystallization ($T_C$ onset), a third tangent 3 is drawn relative to the baseline of the cooling operation (C) at a temperature above the crystallization peak. A fourth tangent 4 is drawn relative to the inflection point of the crystallization peak at a higher temperature than the temperature at the minimum of the crystallization peak. Extrapolate the two tangent lines until they intersect. The vertical extrapolation that intersects the temperature axis indicates the onset temperature for crystallization ($T_C$ onset). The sintering window (W) is the temperature difference between the onset temperature for melting ($T_M$ onset) and the onset temperature for crystallization ($T_C$ onset). Therefore: W=$T_M$ onset−$T_C$ onset.

In the context of the disclosure, the term "sintering window (W)" and the term "temperature difference (ΔT) between the onset temperature for melting ($T_M$ onset) and the onset temperature for crystallization ($T_C$ onset)" have the same meaning and are used synonymously.

According to embodiments, the temperature difference (ΔT) between the onset temperature for melting ($T_M$ onset) and the onset temperature for crystallization ($T_C$ onset) of the thermoplastic (e.g. the sintering window WP) should be greater than 10° C. (such as 10° C. to 80° C., 10° C. to 70° C., 10° C. to 60° C., 20° C. to 80° C., 20° C. to 70° C., or 20° C. to 60° C.) for achieving the obvious and large sintering window WT of the obtained thermoplastic vulcanizate powder (e.g. the temperature difference (ΔT) between the onset temperature for melting ($T_M$ onset) and the onset temperature for crystallization ($T_C$ onset) of the thermoplastic vulcanizate powder). As such, the selective laser sintering composition of the disclosure makes it easy to form an object with better precision using the selective laser sintering 3D printing method.

According to embodiments of the disclosure, the thermoplastic can be polyester elastomer, polypropylene, polyethylene, polyurethane, poly(ethylene terephthalate), polyamide (nylon), or a combination thereof. According to embodiments of the disclosure, the thermoplastic may have a number average molecular weight of 50,000 to 500,000, such that the sintering window ($W_P$) thermoplastic is larger than or equal to 10° C. According to embodiments of the disclosure, the thermoplastic can be polypropylene, polyethylene, polyurethane, poly(ethylene terephthalate), polyamide, or a combination thereof having a sintering window ($W_P$) of greater than or equal to 10° C. According to embodiments of the disclosure, the thermoplastic does not include thermoplastic silane-based plastic or thermoplastic siloxane-based plastic. In other words, the thermoplastic of the disclosure is a polymer free of silane moiety or siloxane moiety.

According to embodiments of the disclosure, the temperature difference (ΔT, the sintering window $W_T$) of the onset temperature of melting the thermoplastic vulcanizate powder and onset temperature at which the thermoplastic crystallizes vulcanizate power can be greater than or equal to 10° C. (such as 10° C. to 80° C., 10° C. to 70° C., 10° C. to 60° C., 20° C. to 80° C., 20° C. to 70° C., or 20° C. to 60° C.). According to embodiments of the disclosure, the temperature difference (ΔT) between the onset temperature of melting and the onset temperature at which the thermoplastic crystallizes vulcanizate powder (e.g. the sintering window $W_T$) is proportional to the temperature difference (ΔT) between the onset temperature of melting and the onset temperature at which the thermoplastic crystallizes (e.g. the sintering window WP).

According to embodiments of the disclosure, the thermoplastic and the crosslinked polymer may have a weight ratio of about 1:1 to 1:4, such as about 1:1, 2:3, 1:2, 3:7, 1:3, or 1:4. If the weight ratio of thermoplastic and the crosslinked polymer is too low (e.g. the weight ratio of thermoplastic and the crosslinked polymer is less than 0.25), the sintering window of the obtained thermoplastic vulcanizate powder will be too narrow (e.g. the temperature difference (ΔT) between the onset temperature of melting and the onset temperature at which the thermoplastic crystallizes vulcanizate powder is less than 10° C.) or non-obvious. The process window of the SLS process is therefore narrow to negatively influence the sinterability and printing quality of the material. Moreover, if the weight ratio of thermoplastic and the crosslinked polymer is too high (e.g. the weight of thermoplastic is greater than the weight of the crosslinked polymer), the product obtained from the selective laser sintering composition of the disclosure has a less elastic recovery deformation property.

According to embodiments of the disclosure, the thermoplastic vulcanizate powder has a Shore A hardness of about 50A to 98A, such as about 50A, 60A, 70A, 80A, 90A, or 95A. The surface hardness of the thermoplastic vulcanizate powder (Shore A hardness) is measured according to the standard ASTM D-2240.

According to embodiments, the crosslinked polymer is a product from crosslinking a rubber and/or a thermoplastic elastomer in the presence of a crosslinker and a plasticizer.

According to embodiments of the disclosure, the rubber can be ethylene-propylene-diene monomer rubber (EPDM), nature rubber (NR), polybutadiene rubber (BR), nitrile butadiene rubber (NBR), styrene-butadiene rubber (SBR), acrylic rubber (ACM), ethylene-propylene rubber (EPR), or a combination thereof. According to embodiments of the disclosure, the rubber may have a number average molecular weight of 80,000 to 1,000,000. According to embodiments of the disclosure, the thermoplastic elastomer can be polyolefin elastomer (POE), styrene-butadiene-styrene block copolymer (SBS), styrene-isoprene-styrene block copolymer (SIS), styrene-ethylene/butylene styrene block copolymer (SEBS), styrene-ethylene/propylene-styrene block copolymer (SEPS), or a combination thereof. According to embodiments of the disclosure, the polyolefin elastomer (POE) can be polymer or copolymer of olefin-based monomer (e.g. α-olefin-based monomer). For example, the olefin-based monomer can be ethylene, propylene, isobutylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl 1-hexene, 3-ethyl-1-hexene, 1-octene, isoprene, tetrafluoroethylene, 1-decene, 1-dodecene, 1-tetradecene, 1-cetene, 1-octadecene, 1-icosene, cyclobutene, cyclopentene, cyclohexene, cyclooctene, 1,3-butadiene, 1,3-pentadiene, 3,4-dimethylcyclopentene, 3-methylcyclohexene, 2- (2-methylbutyl)-1-cyclohexene, 1,4-hexadiene, 4-methyl-1,4-hexadiene, 5-methyl-1,4-hexadiene, 7-methyl-1,6-octadiene, 3,7-dimethyl-1,6-octadiene, 5,7-dimethyl-1,6-octadiene, 1,7-octadiene, 3,7,11-trimethyl-1,6,10-octatriene, 6-methyl-1,5-heptadiene, 1,6-heptadiene, 1,8-nonadiene, 1,9-decadiene, or 1,10-undecanediene. In addition, the polyolefin elastomer can be polyethylene (PE), high density polyethylene (HDPE), linear low density polyethylene (LLDPE), low density polyethylene (LDPE), polypropylene, poly(propylene-α-olefin), ethylene-propylene copolymer (EPC), poly(ethylene-α-olefin), poly(ethylene-octene), poly(ethylene-hexene), poly(ethylene-butene), poly(ethylene-heptene), polybutene, polypentene, ethylene-vinylacetate copolymer (EVA), ethylene-ethylacrylate copolymer (EEA), or ethylene-butylacrylate (EBA). According to embodiments of the disclosure, the thermoplastic elastomer may have a number average molecular weight of 50,000 to 300,000.

According to embodiments of the disclosure, the crosslinker can be peroxide, novolac resin, sulfur, sulfide, carbodiimide compound, aliphatic diamine, or a combination thereof.

According to embodiments of the disclosure, the peroxide can be dicumyl peroxide (DCP), perbutyl peroxide (PBP), tert-butylperoxy 2-ethylhexyl carbonate, di-t-butyl peroxide, 2,5-dimethyl-2,5-di(tert-butylperoxy)hexane, 2,5-di (tert-butylperoxy)-2,5-dimethyl-3-hexyne, di(tert-butylperoxyisopropyl)benzene, 1,1-di-(tert-butylperoxy)-3,3,5-trimethylcyclohexane, butyl 4,4-bis(tert-butyldioxy)valerate, benzoyl peroxide, meta-chloroperoxybenzoic acid, 2,4-dichlorobenzoyl peroxide, tert-butyl peroxybenzoate, tert-butylperoxy isopropyl carbonate, diacetyl peroxide, lauroyl peroxide, tert-butyl isopropylphenyl peroxide, or a combination thereof. According to embodiments of the disclosure, the novolac resin can be formed by condensation reaction of a phenol compound and an aldehyde compound, in which the phenol compound can be 4-t-butylphenol, 4-t-octylphenol, 2-ethylphenol, 3-ethylphenol, 4-ethylphenol, o-cresol, m-cresol, p-cresol, 2,5-xylenol, 3,4-xylenol, 3,5-xylenol, 2,3,5-trimethylphenol, 3-methyl-6-t-butylphenol, 2-naphthol, 1,3-dehydroxynaphthalene, bisphenol-A, or a combination thereof, and the aldehyde compound can be formaldehyde, paraformaldehyde, acetoaldehyde, benzaldehyde, phenylaldehyde, or a combination thereof. According to embodiments of the disclosure, the sulfide can be tetrabenzylthiuram disulfide, dibenzothiazole disulfide, or a combination thereof. According to embodiments of the disclosure, the carbodiimide compound can be 1-ethyl-3-(3-dimethylaminopropyl)carbodiimide, N,N'-dicyclohexylcarbodiimide, or a combination thereof. According to embodiments of the disclosure, the aliphatic diamine can be hexane diamine, octane diamine, nonane diamine, decane diamine, 1,16-hexadecane diamine, 1,18-octadecane diamine, or a combination thereof.

According to embodiments of the disclosure, the plasticizer can be silicon oil, mineral oil, paraffin oil, or a combination thereof.

According to embodiments, the manufacture of the thermoplastic vulcanizate powder includes the following steps. First, the thermoplastic and the rubber (and/or the thermoplastic elastomer) are blended to form a blend. Subsequently, the crosslinker and the plasticizer were added, such that the crosslinking between the rubber (and/or the thermoplastic elastomer) in the blend is occurred to vulcanize the rubber. The original continuous rubber phase may be dispersed in the plastic phase (phase inversion) by the shear interaction produced during the crosslinking, thereby obtaining the thermoplastic vulcanizate. After the thermoplastic vulcanizate being dried by baking, milled, and sieved, the thermoplastic vulcanizate powder is obtained. The "blending" in the disclosure means the process of evenly mixing the rubber or the plastic with the reagent (such as the crosslinker and the plasitcizer) by mechanical action, and the blending step can be performed in a discontinuous manner or a batch-wise manner.

According to embodiments of the disclosure, manufacture of thermoplastic vulcanizate can be a dynamic cross-linking process. The term "dynamic cross-linking" means a process in which the mixture and the crosslinker are kneaded to form crosslinking between the rubber during melt blending the rubber and the plastic in the mixture. The term "dynamic" means the mixture exerting shear in the crosslinking step. The temperature of the blending period can be adjusted to a range between the melting point and the decomposition temperature of the used plastic for better melt blending the rubber and the plastic.

The disclosure also provides a selective laser sintering 3D printing method, which utilizes the described selective laser sintering composition to perform the 3D printing method. The method includes (A) forming a film composed of the selective laser sintering composition; (B) selectively irradiating the film via laser beam scanning to cure the selective laser sintering composition for forming a part of an object; and (C) repeating step (A) and step (B) until the object is complete.

According to embodiments of the disclosure, the film thickness can be common film thickness that is used in conventional selective laser sintering 3D printing method, such as 80 μm to 150 μm. According to embodiments of the disclosure, the suitable laser for the selective laser sintering is well-known by the skilled in the art, such as Nd:YAG laser (neodymium-doped yttrium aluminum garnet laser) or carbon dioxide laser.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Thermoplastic Vulcanizate Powder

Preparation Example 1

70 parts by weight of ethylene propylene diene monomer rubber (EPDM, NORDEL™ 4570 commercially available from DOW), 30 parts by weight of polypropylene having an onset melting temperature of 147.2° C., an onset crystallization temperature of 132.6° C., and a temperature difference therebetween (ΔT) of 14.6° C. (PP, 9580 commercially available from LCY Chemical Co.), 1.5 parts by weight of peroxide serving as a crosslinker (DCP commercially available from Keeneyes Industrial Co.), and 40 parts by weight of mineral oil serving as plasticizer (FOMI-250 commercially available from Chou Feng Enterprise Co., Ltd.) were added into a kneader (JKM-DK10) at a temperature of 150° C. and a screw rotation rate of 50 rpm to 100 rpm. After being kneaded for 20 minutes, the mixture was pelletized by a pelletizer (GZML-110L-150) at a temperature of 50° C. to 100° C. and a screw rotation rate of 20 rpm to obtain thermoplastic vulcanizate masterbatch. Subsequently, the thermoplastic vulcanizate masterbatch was freeze milled in liquid nitrogen by a miller and then sieved to respectively obtain thermoplastic vulcanizate powder (1) having a particle size distribution D90 of about 82 μm and thermoplastic vulcanizate powder (2) having a particle size distribution D90 of about 146 μm. The hardness and the sintering window WT of the obtained thermoplastic vulcanizate powder (1) and the obtained thermoplastic vulcanizate powder (2) were measured, as shown in Table 1.

Preparation Example 2

60 parts by weight of ethylene propylene diene monomer rubber (EPDM, NORDEL™ 4570 commercially available from DOW), 40 parts by weight of polypropylene having an onset melting temperature of 147.2° C., an onset crystallization temperature of 132.6° C., and a temperature difference therebetween (ΔT) of 14.6° C. (PP, 9580 commercially available from LCY Chemical Co.), 1.2 parts by weight of peroxide serving as a crosslinker (DCP commercially available from Keeneyes Industrial Co.), and 30 parts by weight of mineral oil serving as plasticizer (FOMI-250 commercially available from Chou Feng Enterprise Co., Ltd.) were added into a kneader (JKM-DK10) at a temperature of 150°

C. and a screw rotation rate of 50 rpm to 100 rpm. After being kneaded for 20 minutes, the mixture was pelletized by a pelletizer (GZML-110L-150) at a temperature of 50° C. to 100° C. and a screw rotation rate of 20 rpm to obtain thermoplastic vulcanizate masterbatch. Subsequently, the thermoplastic vulcanizate masterbatch was freeze milled in liquid nitrogen by a miller and then sieved to obtain thermoplastic vulcanizate powder (3) having a particle size distribution D90 of about 91 μm. The hardness and the sintering window $W_T$ of the obtained thermoplastic vulcanizate powder (3) were measured, as shown in Table 1.

Preparation Example 3

Preparation Example 3 was similar to Preparation Example 2, and the difference in Preparation Example 3 was the weight ratio of EPDM and PP being adjusted from 60:40 to 80:20 to obtain thermoplastic vulcanizate powder (4) having a particle size distribution D90 of about 85 μm. The hardness and the sintering window WT of the obtained thermoplastic vulcanizate powder (4) were measured, as shown in Table 1.

Preparation Example 4

Preparation Example 4 was similar to Preparation Example 2, and the difference in Preparation Example 4 was the weight ratio of EPDM and PP being adjusted from 60:40 to 50:50 to obtain thermoplastic vulcanizate powder (5) having a particle size distribution D90 of about 81 μm. The hardness and the sintering window WT of the obtained thermoplastic vulcanizate powder (5) were measured, as shown in Table 1.

Ltd.) were added into a kneader (JKM-DK10) at a temperature of 150° C. and a screw rotation rate of 50 rpm to 100 rpm. After being kneaded for 20 minutes, the mixture was pelletized by a pelletizer (GZML-110L-150) at a temperature of 50° C. to 100° C. and a screw rotation rate of 20 rpm to obtain thermoplastic vulcanizate masterbatch. Subsequently, the thermoplastic vulcanizate masterbatch was freeze milled in liquid nitrogen by a miller and then sieved to obtain thermoplastic vulcanizate powder (6) having a particle size distribution D90 of about 86 μm. The hardness and the sintering window WT of the obtained thermoplastic vulcanizate powder (6) were measured, as shown in Table 2.

Preparation Example 6

Preparation Example 6 was similar to Preparation Example 5, and the difference in Preparation Example 6 was the SEBS being replaced with styrene-ethylene/propylene-styrene block copolymer (SEPS, G1730 commercially available from Kraton Corporation) to obtain thermoplastic vulcanizate powder (7) having a particle size distribution D90 of about 79 μm. The hardness and the sintering window $W_T$ of the obtained thermoplastic vulcanizate powder (7) were measured, as shown in Table 2.

Preparation Example 7

Preparation Example 7 was similar to Preparation Example 5, and the differences in Preparation Example 7 were the SEBS being replaced with acrylic rubber (ACM, AR-51 commercially available from Zeon) and the PP being replaced with nylon having an onset melting temperature of 203.2° C., an onset crystallization temperature of 181.5° C.,

TABLE 1

| | Rubber (or elastomer) | Plastic | Weight ratio of rubber (or elastomer) and plastic | Particle size distribution D90 (μm) | Hardness (Shore A) | Sintering window $W_T$ (° C.) |
|---|---|---|---|---|---|---|
| Thermoplastic vulcanizate powder (1) | EPDM | PP | 70:30 | 82 | 60 | 14.6 |
| Thermoplastic vulcanizate powder (2) | EPDM | PP | 70:30 | 146 | 60 | 13.1 |
| Thermoplastic vulcanizate powder (3) | EPDM | PP | 60:40 | 91 | 72 | 14.3 |
| Thermoplastic vulcanizate powder (4) | EPDM | PP | 80:20 | 85 | 51 | 13.8 |
| Thermoplastic vulcanizate powder (5) | EPDM | PP | 50:50 | 81 | 86 | 12.6 |

Preparation Example 5

70 parts by weight of styrene-ethylene/butylene-styrene block copolymer (SEBS, Taipol 6014 commercially available from TSRC Co.), 30 parts by weight of polypropylene having an onset melting temperature of 142.8° C., an onset crystallization temperature of 121.5 , and a temperature difference therebetween (ΔT) of 21.3° C. (PP, 8681 commercially available from LCY Chemical Co.), 1.2 parts by weight of peroxide serving as a crosslinker (Luperox® 101 commercially available from Arkema), and 80 parts by weight of mineral oil serving as plasticizer (FOMI-550 commercially available from Chou Feng Enterprise Co., and a temperature difference therebetween (ΔT) of 21.7° C. (PA6N, commercially available from FORMOSA CHEMICALS & FIBRE CORPORATION) to obtain thermoplastic vulcanizate powder (8) having a particle size distribution D90 of about 88 μm. The hardness and the sintering window $W_T$ of the obtained thermoplastic vulcanizate powder (8) were measured, as shown in Table 2.

Preparation Example 8

Preparation Example 8 was similar to Preparation Example 5, and the difference in Preparation Example 8 was the SEBS being replaced with natural rubber (NR, 3L commercially available from PuFei Chemical Engineering)

to obtain thermoplastic vulcanizate powder (9) having a particle size distribution D90 of about 95 μm. The hardness and the sintering window $W_T$ of the obtained thermoplastic vulcanizate powder (9) were measured, as shown in Table 2.

Comparative Example 1

100 parts by weigh of thermoplastic polyester elastomer (TPEE, 4056 commercially available from Dupont) was freeze milled in liquid nitrogen by a miller and then sieved to obtain TPEE powder having a particle size distribution D90 of about 86 μm. The hardness of the TPEE powder was measured, as shown in Table 2. The obtained TPEE powder was analyzed by differential scanning calorimetry (DSC). Because the melting peak of the TPEE powder was too broad and very close to crystallization peak of the TPEE powder, the sintering window Wp could not be measured.

Comparative Example 2

100 parts by weigh of polyurethane (TPU, S385A commercially available from Lubrizol) was freeze milled in liquid nitrogen by a miller and then sieved to obtain TPU powder having a particle size distribution D90 of about 80 μm. The hardness of the TPU powder was measured, as shown in Table 2. The obtained TPU powder was analyzed by differential scanning calorimetry (DSC). Because the melting peak of the TPU powder was too broad and very close to crystallization peak of the TPU powder, the sintering window Wp could not be measured.

tensile strength of the sample was measured according to the standard ASTM D412. The 3D printing precision test was observing the sample formed from the selective laser sintering composition to check whether the shape of a designed square hole (with a side length of 2 mm) be intact. If rough side or hole deformation was observed, the shape of the square hole would be not intact. The precision test was passed when the square hole was intact.

Examples 2 to 9

Examples 2 to 9 were similar to Example 1, and the difference in Examples 2 to 9 was the thermoplastic vulcanizate powder (1) being respectively replaced with the thermoplastic vulcanizate powder (2) to (9) to obtain selective laser sintering compositions (2) to (9). The flowability of the selective laser sintering compositions (2) to (9) were then tested, as shown in Table 3. Subsequently, the selective laser sintering compositions (2) to (9) were respectively selective laser sintering 3D printed (the film thickness was 150 μm, the powder bed temperature of the thermoplastic vulcanizate powder (2) to (7) and (9) was 140° C., and the powder bed temperature of the thermoplastic vulcanizate powder (8) was 190° C.) to obtain samples. The tensile strength and 3D printing precision of the samples were tested, as shown in Table 3.

Comparative Examples 3 and 4

Comparative Examples 3 and 4 were similar to Example 1, and the difference in Comparative Examples 3 and 4 was

TABLE 2

| | Rubber (or elastomer) | Plastic | Weight ratio of rubber (or elastomer) and plastic | Particle size distribution D90 (μm) | Hardness (Shore A) | Sintering window WT (° C.) |
|---|---|---|---|---|---|---|
| Thermoplastic vulcanizate powder (6) | SEBS | PP | 70:30 | 86 | 52 | 16 |
| Thermoplastic vulcanizate powder (7) | SEPS | PP | 70:30 | 79 | 63 | 15 |
| Thermoplastic vulcanizate powder (8) | ACM | Nylon | 70:30 | 88 | 95 | 22 |
| Thermoplastic vulcanizate powder (9) | NR | PP | 70:30 | 95 | 90 | 17 |
| TPEE powder | — | TPEE | — | 86 | 92 | None |
| TPU powder | — | TPU | — | 80 | 94 | None |

Selective Laser Sintering Composition

Example 1

99.8 parts by weight of the thermoplastic vulcanizate powder (1) and 0.2 parts by weight of silicon oxide powder (having a particle size distribution D90 of 20 nm) were evenly mixed to obtain a selective laser sintering composition (1). The flowability of the selective laser sintering composition (1) was tested, as shown in Table 3. Subsequently, the selective laser sintering composition (1) was selective laser sintering 3D printed (the film thickness was 150 μm and the powder bed temperature was 140° C.) to obtain a sample. The tensile strength and 3D printing precision of the sample were tested, as shown in Table 3. The the thermoplastic vulcanizate powder (1) being respectively replaced with the TPEE powder in Comparative Example 1 and the TPU powder in Comparative Example 2 to obtain selective laser sintering compositions (10) and (11). The flowability of the selective laser sintering compositions (10) and (11) were then tested, as shown in Table 3. Subsequently, the selective laser sintering compositions (10) and (11) were respectively selective laser sintering 3D printed (the film thickness was 150 um, the powder bed temperature of the TPEE powder was 120° C., and the powder bed temperature of the TPU powder was 90° C.) to obtain samples. The tensile strength and 3D printing precision of the samples were tested, as shown in Table 3.

TABLE 3

| | Powder | Flowability (Angle of Response) | Tensile strength (Kg/cm$^2$) | Test of 3D printing precision |
|---|---|---|---|---|
| Example 1 | Selective laser sintering composition (1) | 22.5 | 65 | Pass |
| Example 2 | Selective laser sintering composition (2) | 42.3 | 23 | Not pass |
| Example 3 | Selective laser sintering composition (3) | 26.1 | 89 | Pass |
| Example 4 | Selective laser sintering composition (4) | 21.9 | 60 | Pass |
| Example 5 | Selective laser sintering composition (5) | 23.6 | 96 | Pass |
| Example 6 | Selective laser sintering composition (6) | 27.5 | 59 | Pass |
| Example 7 | Selective laser sintering composition (7) | 25.3 | 82 | Pass |
| Example 8 | Selective laser sintering composition (8) | 25.9 | 101 | Pass |
| Example 9 | Selective laser sintering composition (9) | 24.6 | 55 | Pass |
| Comparative Example 3 | Selective laser sintering composition (10) | 29.5 | 30 | Not pass |
| Comparative Example 4 | Selective laser sintering composition (11) | 28.4 | 70 | Not Pass |

The thermoplastic vulcanizate powder used in the selective laser sintering composition (1) and the selective laser sintering composition (2) had the same material, and the difference therebetween was the particle size distribution D90 of the thermoplastic vulcanizate powder used in the selective laser sintering composition (1) being less than 100 μm, and the particle size distribution D90 of the thermoplastic vulcanizate powder used in the selective laser sintering composition (2) being greater than 100 μm. As shown in Table 3, when the used thermoplastic vulcanizate powder had a particle size distribution D90 greater than 100 um, the sample could not pass the test of 3D printing precision. In addition, the sample prepared from the selective laser sintering composition (10) of the TPEE powder had an obviously worse tensile strength. Next, because the TPEE powder and the TPU powder did not have a sintering window $W_T$ (or they had a sintering window $W_T$ of less than 10° C.), it is not easy to form an object with these powders using the selective laser sintering 3D printing method, and the obtained object had poor precision.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A selective laser sintering composition, comprising:
    a nanoscale inorganic powder having a particle size distribution D90 of 1 nm to 950 nm; and
    a thermoplastic vulcanizate powder, wherein a temperature difference (ΔT) between an onset temperature for melting the thermoplastic vulcanizate powder and an onset temperature for crystallization of the thermoplastic vulcanizate powder is greater than or equal to 10° C., and the thermoplastic vulcanizate powder has a particle size distribution D90 of 40 μm to 100 μm,
    wherein the thermoplastic vulcanizate powder includes:
        a thermoplastic, wherein a temperature difference (ΔT) between an onset temperature for melting the thermoplastic and an onset temperature for crystallization of the thermoplastic is greater than or equal to 10° C.; and
        a crosslinked polymer, wherein the crosslinked polymer is a crosslinked rubber, a crosslinked thermoplastic elastomer, or a combination thereof, and wherein a weight ratio of the thermoplastic to the crosslinked polymer is from 1:1 to 1:4.

2. The selective laser sintering composition as claimed in claim 1, wherein the nanoscale inorganic powder and the thermoplastic vulcanizate powder have a weight ratio of 0.2:99.8 to 0.8:99.2.

3. The selective laser sintering composition as claimed in claim 1, wherein the thermoplastic vulcanizate powder has a Shore A hardness of 50A to 98A.

4. The selective laser sintering composition as claimed in claim 1, wherein the nanoscale inorganic powder is silicon oxide, aluminum oxide, titanium oxide, calcium carbonate, magnesium silicate, zinc oxide, magnesium oxide, or a combination thereof.

5. The selective laser sintering composition as claimed in claim 1, wherein the thermoplastic is polypropylene, polyethylene, polyurethane, poly(ethylene terephthalate), nylon, or a combination thereof.

6. The selective laser sintering composition as claimed in claim 1, wherein the crosslinked polymer is a product from crosslinking a rubber and/or a thermoplastic elastomer in the presence of a crosslinker and a plasticizer.

7. The selective laser sintering composition as claimed in claim 6, wherein the rubber is ethylene propylene diene monomer rubber, natural rubber, polybutadiene rubber, nitrile butadiene rubber, styrene butadiene rubber, acrylic rubber, ethylene-propylene rubber, or a combination thereof.

8. The selective laser sintering composition as claimed in claim 6, wherein the thermoplastic elastomer is polyolefin elastomer, styrene-butadiene-styrene block copolymer, styrene-isoprene-styrene triblock copolymer, styrene-ethylene/butene-styrene block copolymer, or a combination thereof.

9. The selective laser sintering composition as claimed in claim 6, wherein the crosslinker is peroxide, novolac resin, sulfur, sulfide, carbodiimide compound, aliphatic diamine, or a combination thereof.

10. The selective laser sintering composition as claimed in claim 6, wherein the plasticizer is silicon oil, mineral oil, paraffin oil, or a combination thereof.

11. The selective laser sintering composition as claimed in claim 1, further comprising:
    an additive, wherein the additive is dye, pigment, antioxidant, stabilizer, fixative, or a combination thereof.

12. A selective laser sintering 3D printing method, comprising:
    (A) forming a film including the selective laser sintering composition as claimed in claim 1;
    (B) selectively irradiating the film via laser beam scanning to cure the selective laser sintering composition for forming a part of an object; and
    (C) repeating step (A) and step (B) until the object is complete.

* * * * *